United States Patent [19]

Schlueter

[11] Patent Number: 5,067,845

[45] Date of Patent: Nov. 26, 1991

[54] CLAMP-HUB

[76] Inventor: Charles Schlueter, 10132 Elba La., St. Louis, Mo. 63137

[21] Appl. No.: 623,211

[22] Filed: Dec. 6, 1990

[51] Int. Cl.⁵ .............................................. B25G 3/00
[52] U.S. Cl. ..................................... 403/344; 403/290; 403/261
[58] Field of Search ................. 403/344, 362, 261, 290

[56] References Cited

U.S. PATENT DOCUMENTS

| | | | |
|---|---|---|---|
| 3,109,663 | 11/1963 | Phillips, Jr. ........................ | 403/344 X |
| 3,127,202 | 3/1964 | Koen ..................................... | 403/19 |
| 4,116,572 | 9/1978 | Heldmann et al. .............. | 403/344 X |
| 4,217,061 | 8/1980 | Eiland et al. ........................ | 403/313 |
| 4,848,951 | 7/1989 | Boogerman ..................... | 403/344 X |

Primary Examiner—Andrew V. Kundrat
Attorney, Agent, or Firm—Polster, Polster and Lucchesi

[57] ABSTRACT

A clamp-hub (1) for use in attaching a component (A) to a machine. A clamp-hub body (3) has a first section (5) of one thickness and a second section (7) of a different thickness. The second body section is attachable to the component. The body has a longitudinal, central bore (17) for accommodating a machine shaft and a clamping mechanism (27) for clamping the component in place.

19 Claims, 2 Drawing Sheets

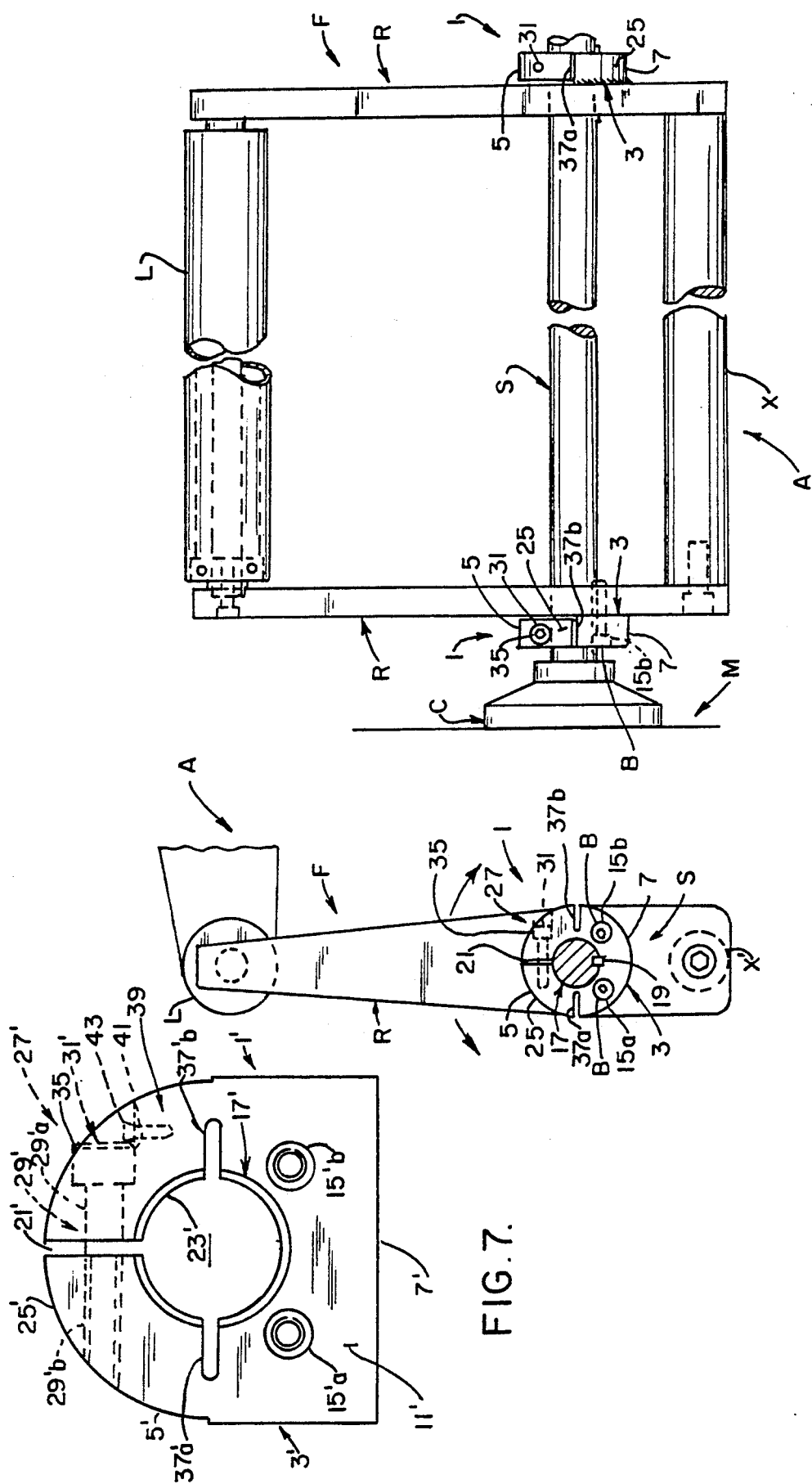

CLAMP-HUB

BACKGROUND OF THE INVENTION

This invention relates to machine fittings and accessories and more particularly, to a clamping hub-type device for locating and holding various machine members on a rotating or stationary shaft of a machine.

In many industrial operations, it is necessary or advantageous to be able to quickly, and efficiently, install a part to a machine. Thus, for example, a machine used for one operation can be reconfigured to perform another operation. For this purpose, various types of fittings or accessories are provided with a crank, spool, take-up reel or similar part that is removably attachable to a rotatable shaft of a machine, or to a hub, boss, or similar machine part. See, for example, U.S. Pat. Nos. 3,109,663, 3,070,389, 2,942,127, 2,689,141, 2,451,405, 1,861,807, and 815,558. In addition to these, there are other fittings currently commercially available which can be used for this purpose. However, none is sufficiently flexible in design so to be used in a wide range of applications. Such flexibility would be advantageous because it would reduce the number of parts required, and therefore cost.

SUMMARY OF THE INVENTION

Among the several objects of the present invention is the provision of a clamp-hub which is temporarily or permanently attachable to a machine or a component thereof; the provision of such a clamp-hub which can be used with a wide variety of components (gears, cams, sprockets, pulleys, wheels, handles, guide rails and bars, etc.) to attach them to the machine; the provision of such a clamp-hub by which the component can be temporarily or permanently attached to the machine; the provision of such a clamp-hub which is rugged, simple in design and small enough to be easily stored, even stored with the component; the provision of such a clamp-hub by which the component can be precisely oriented with respect to a machine shaft, which does not mar the shaft, and which maintains an exact synchronization with the machine; the provision of such a clamp-hub which provides maximum torque transmission as well as maximum shock resistance, and minimizes backlash between the component and the shaft; the provision of such a clamp-hub by which components can be quickly and easily changed to permit the machine to be converted from one type operation to another; and, the provision of such a clamp-hub to come in a variety of sizes.

Basically, the present invention is directed to a clamp-hub for use with a machine to attach a component thereto. The clamp-hub has a body with a first section and a second section. The second section is thicker than the first section and is attachable to a mating surface of the component. A bore extends through the body. The first section has a screw clamp for tightening the clamp-hub about a portion of the machine such as a shaft to clamp it in place. Other components then attach to the clamp-hub. Other objects and features will be in part apparent and in part pointed out hereinafter.

BRIEF DESCRIPTION OF THE DRAWINGS

In the drawings,

FIG. 7 is a front plan view of a second embodiment of the invention; and

FIGS. 8 and 9 illustrate an application of the invention.

Corresponding reference characters indicate corresponding parts throughout the drawings.

DESCRIPTION OF THE PREFERRED EMBODIMENT

Figure 3:
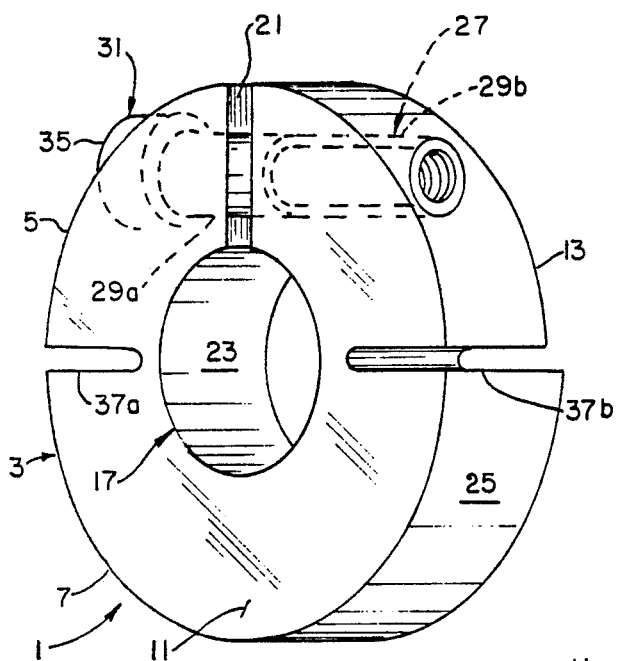
FIG. 3 is a perspective view of a first embodiment of a clamp-hub of the present invention.
Figure 4:
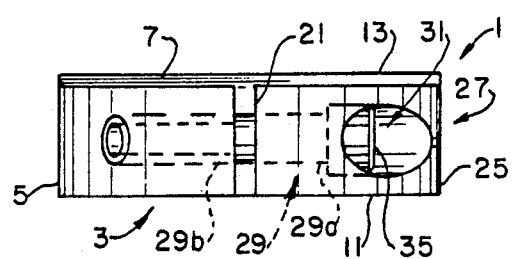
FIGS. 4–6 are respective top plan, front, and side elevational views of the clamp-hub.
Figure 6:
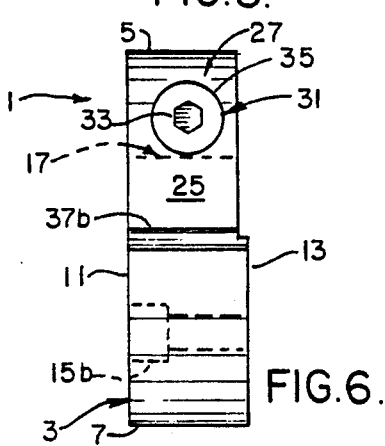

Referring to the drawings, a clamp-hub device 1 of the present invention is for use with a machine M (see FIGS. 8, 9) to attach a component A to the machine. It will be understood that the clamp-hub is attachable to various portions of the machine, a machine component, etc. Clamp-hub 1 has a body 3 which, as shown in FIG. 3, is circular in shape. This body has a first, or upper section, 5 and a second, or lower section, 7 (see FIG. 6). As best seen in FIGS. 4 and 6, section 7 is a thicker section than section 5. In addition, the clamp-hub, when attached to machinery, has an outer face 11 and an inner face 13 (see FIG. 6). The outer face is uniform throughout the length and breadth of the clamp body; while, the inner face is stepped such that while the lower portion of the face abuts mating surface S of the component, the upper portion of the face is spaced outwardly therefrom. The result is that the clamp-hub is attachable to the component, by, for example, welding or gluing the lower section of the body to the component. At the same time, the upper body section remains out of contact with the component (see FIG. 9).

In addition to welding or gluing, the clamp-hub has one, and preferably, a pair of parallel spaced apart holes 15a, 15b extending longitudinally through section 7. These holes can accommodate bolts B (see FIGS. 8 and 9) for attaching the clamp-hub to the component. Or, if the holes are threaded, as shown in FIG. 7, screws (not shown) can be used for attachment. It will be noted, therefore, that the clamp-hub can be secured, either temporarily or permanently, to the component in any number of ways. The particular way chosen is whatever is convenient to the user.

Figure 5:
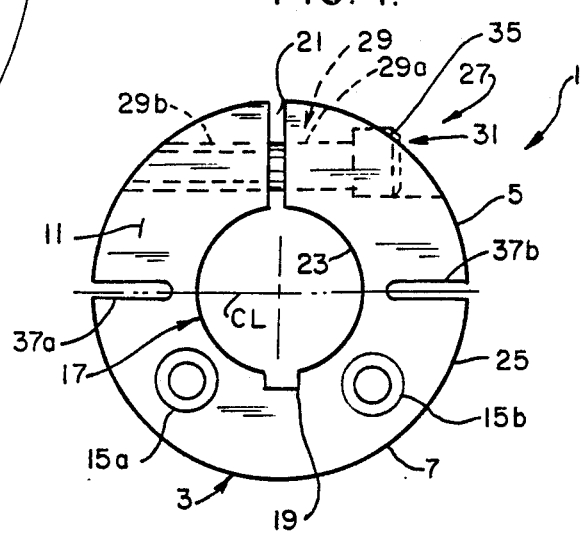

The clamp-hub next has a longitudinal, central bore 17 which can be of any convenient diameter. The bore can be smooth (see FIGS. 5, 6) or threaded (see FIG. 7). If desired, the bore can have an associated keyway 19 of any convenient size or shape such as the rectangular keyway 19 extending longitudinally of the hub body, as shown in FIG. 5. Clamp-hub 1 is a split clamp-hub and as such has a radial slot or split 21 extending from sidewall 23 of bore 17, through body section 5, to its outer sidewall 25. The clamp-hub has a clamping means 27 for releasably securing the component to the machine shaft.

Means 27 further includes a bore 29 orthogonal to split 21 and extending from one side of the hub clamp body, through the split, to its other side. As seen in the drawings, bore 29 has a smooth bore section 29a on one side of the split, and a threaded bore section 29b on the other side thereof. A screw 31 is insertable into the smooth bore section 29a, across the split, and into section 29b. The screw, which may, for example, have a hexagonal recess 33 in its head 35, for an Allen wrench or the like, draws the two sides of the clamp-hub body together when it is turned in the appropriate direction. This tightens the body about the shaft to clamp it in place. To enhance the gripping action, body 3 has opposed, radial slots 37a, 37b. These slots may extend inwardly from the sidewall of the body toward bore 17, as shown in FIGS. 3 and 5; or, from the sidewall of the bore outwardly, as shown in FIG. 7 or one inward and one outward. In either embodiment, the slots, which are positioned, more or less, on the transverse center line CL of the clamp body, allow body section 5 to flex as screw 31 is tightened so the upper body section is drawn more tightly about the shaft.

Referring to FIG. 7, the clamp-hub has a means 39 for opening the clamp-hub and releasing the component. As shown, a bore 41 is formed in smooth bore section 29a immediately behind the location of screw head 35, when the hub clamp is tightened. A pin or dowel 43 is inserted in the bore and the head of the pin projects into section 29a. This prevents screw 31 from being backed out of the bore. Now, further turning the screw will force the sides of the clamp-hub body apart, and open the clamp.

It will be understood that clamp body 3 can be circular in shape as shown in FIGS. 3-6, rectangular, or as shown in FIG. 7, the upper section may be circular and the lower section rectangular. Other convenient shapes may also be provided. Further the diameter of bore 17 may be greater or smaller than shown.

Figure 1:
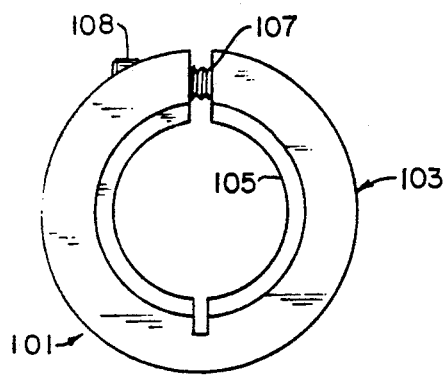
FIGS. 1 and 2 are representations of respective prior art devices for attaching components to a machine.
Figure 2:
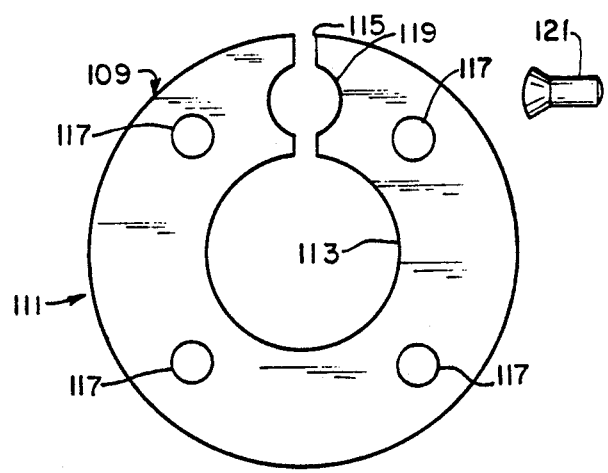

It will further appreciated that clamp-hub 1 has several advantages over the prior art devices shown in FIGS. 1 and 2. In the device of FIG. 1, a collar or clamping device 101 has a body 103. The device is a split clamp having a threaded central bore 105 with a split 107. It will be noted that the device does not allow ready attachment to the machine except by welding or gluing, for example.

A screw 108 is used for clamping purposes. The device has a uniform thickness throughout its length as does the body 109 of a device 111 shown in FIG. 2. This latter device has a smooth central bore 113 with a split 115. The device has bolt holes 117 extending therethrough for attachment of the device to a machine. A hole 119 formed in split 115 accommodates a plug 121 of varying diameter. Insertion of the plug in the opening forces the sides of the body apart to release the accessory. It will be noted that this device relies only on tension to hold the component in place. Also, because this device has a uniform thickness throughout its length, it cannot be welded to a machine as the clamp-hub of the present invention can be.

Referring to FIGS. 8 and 9, a practical application of the invention is shown. Here, a frame F has side rails R. A fixed roll X is located at one end of the frame and a rotatable roll L at the other end. A shaft S is attachable to the frame at a point intermediate its length. For this purpose, the shaft is insertable through openings in each rail R. A clamp-hub device of the present invention is used at each rail to attach the shaft to the frame. As seen in FIG. 8, one of the devices is bolted to one of the rails, and the other device is attached to the rail by welding, for example. It will be noted that in each instance, the lower section of the clamp abuts the face of the rail, while the upper section does not. The devices can be then tightened about the respective ends of the shaft.

After attachment, the shaft which is connected by a collar C to a drive shaft (not shown) can be turned to rotate the frame in one direction and wrap a web of material about the rolls; or, turn it in the opposite direction to unwrap the material.

Numerous variations, within the scope of the appended claims, will be apparent to those skilled in the art in light of the foregoing description and accompanying drawings.

These variations are merely illustrative.

Having thus described the invention, what is claimed and desired to be secured by Letters Patent is:

1. A clamp-hub for use with a machine to attach a component to the machine to convert the machine from one type operation to another, comprising:
   a clamp-hub body having a first section and a second section, said second section having a greater thickness than the first section and said second section being attachable to the component;
   a bore extending through the body for attachment of the body to a portion of the machine; and,
   clamping means on the first body section for tightening the clamp-hub about the machine shaft to attach the component to the machine, the clamp-hub having an inner face and an outer face, when the clamp-hub is attached to the machine, the outer face of the clamp-hub being uniform across the length and breadth of the clamp-hub, and the inner face having an inset at the intersection between the first and second sections whereby the inner face of the second section abuts the contacting surface of the component but the inner face of the first section is spaced apart therefrom.

2. The clamp-hub of claim 1 which is a split-type clamp-hub.

3. The clamp-hub of claim 2 in which the second section is attachable to a mating surface of the component by welding.

4. The clamp-hub of claim 2 in which the second section is attachable to the mating surface of the component by gluing.

5. The clamp-hub of claim 2 wherein said second section has at least one longitudinal attaching bore therethrough for a bolt to be inserted throught the attaching bore to attach the clamp-hub to the component.

6. The clamp-hub of claim 5 wherein the attaching bore is threaded for a screw to be used to attach the clamp-hub to the component.

7. The clamp-hub of claim 5 having a pair of parallel, spaced-apart attaching bores extending longitudinally through the second section.

8. The clamp-hub of claim 1 wherein the bore has a keyway for lockingly installing a keyed shaft in the bore.

9. The clamp-hub of claim 8 wherein the bore is threaded.

10. The clamp-hub of claim 2 wherein the clamp-hub has a split extending transversely of the bore from the sidewall of the bore through the first section to the outer wall of the body, and the clamping means includes a locking bore extending transversely of the first section and through the split.

11. The clamp-hub of claim 10 wherein the locking bore on one side of the split is threaded and the clamping means includes a clamping screw threadably received in the locking bore to squeeze the clamp body about the shaft and lock it in place.

12. The clamp-hub of claim 11 further including at least one radial slot offset from the split to allow flexing of the body as the clamping screw is tightened.

13. The clamp-hub of claim 12 having a pair of generally opposed radial slots.

14. The clamp-hub of claim 13 wherein the slots extend inwardly from the sidewall of the body.

15. The clamp-hub of claim 13 wherein the slots extend outwardly from the sidewall of the bore.

16. The clamp-hub of claim 11 further including a pin insertable into the first section of the body behind the head of the clamping screw whereby continued turning of the clamping screw forces apart the first body sections on opposite sides of the split.

17. The clamp-hub of claim 13 wherein one of the slots extends inwardly from the sidewall of the body and one of the slots extends outwardly from the sidewall of the bore.

18. A clamp-hub for use with a machine to attach a component to the machine to convert the machine from type operation to another comprising:
 a clamp-hub body having a first section and a second section, said second section having a greater thickness than the first section and said second section being attachable to the component;
 a bore extending through the body for attachment of the body to a portion of the machine, the bore being a threaded bore and having a keyway for lockingly installing a keyed shaft in the bore; and,
 clamping means on the first body section for tightening the clamp-hub about the machine shaft to attach the component to the machine.

19. A split-type clamp-hub for use with a machine to attach a component to the machine to convert the machine from one type operation to another, comprising:
 a clamp-hub having a first section and a second section, said second section having a greater thickness than the first section and said second section being attachable to the component;
 a bore extending through the body for attachment of the body to a portion of the machine, the clamp-hub having a split extending transversely of the bore from the sidewall of the bore through the first section to the outer wall of the body;
 clamping means on the first body section for tightening the clamp-hub about the machine shaft to attach the component to the machine, the clamping means including a locking bore extending transversely of the first section and through the split, the locking bore on one side of the split being threaded and the clamping means further including a clamping screw threadably received in the locking bore to squeeze the clamp body about the shaft to lock it in place; and,
 a pair of generally opposed radial slots offset from the split to allow flexing of the body as the clamping screw is tightened.

* * * * *